(12) United States Patent
Gwidt et al.

(10) Patent No.: US 11,668,259 B1
(45) Date of Patent: Jun. 6, 2023

(54) PORT-DIRECT INJECTION ENGINE METHODS AND SYSTEMS OPTIMIZING FUEL ECONOMY WITH PARTICULATE CONTROL

(71) Applicant: GM GLOBAL TECHNOLOGY OPERATIONS LLC, Detroit, MI (US)

(72) Inventors: J. Michael Gwidt, Brighton, MI (US); Andrew B. Gillett, Bloomfield Township, MI (US); Karen Margaret-Bell Gwidt, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/058,069

(22) Filed: Nov. 22, 2022

(51) Int. Cl.
| | | |
|---|---|---|
| F02D 41/14 | (2006.01) | |
| F02D 41/38 | (2006.01) | |
| F02D 41/32 | (2006.01) | |
| F02D 13/02 | (2006.01) | |
| F02B 75/04 | (2006.01) | |
| F02D 41/00 | (2006.01) | |
| F02D 41/24 | (2006.01) | |

(52) U.S. Cl.
CPC ......... *F02D 41/1401* (2013.01); *F02D 13/02* (2013.01); *F02D 41/32* (2013.01); *F02D 41/38* (2013.01); *F02B 75/048* (2013.01); *F02D 13/0269* (2013.01); *F02D 41/2422* (2013.01); *F02D 2041/001* (2013.01); *F02D 2041/1412* (2013.01); *F02D 2041/1433* (2013.01); *F02D 2041/389* (2013.01); *F02D 2200/0625* (2013.01); *F02D 2200/101* (2013.01); *F02D 2200/1002* (2013.01)

(58) Field of Classification Search
CPC .... F02B 75/048; F02D 13/02; F02D 13/0269; F02D 41/1401; F02D 41/2422; F02D 41/32–3818; F02D 41/3836–3872; F02D 2041/001; F02D 2041/1412; F02D 2041/1433; F02D 2041/3881–389; F02D 2200/0625; F02D 2200/1002; F02D 2200/101
See application file for complete search history.

(56) References Cited

U.S. PATENT DOCUMENTS

| | | | |
|---|---|---|---|
| 8,069,839 B2 | 12/2011 | Cohn et al. | |
| 8,100,107 B2 * | 1/2012 | Bidner | F02D 41/3094 |
| | | | 123/299 |

(Continued)

*Primary Examiner* — Hung Q Nguyen
*Assistant Examiner* — Mark L. Greene
(74) *Attorney, Agent, or Firm* — Lorenz & Kopf LLP

(57) ABSTRACT

Methods and systems for optimizing fuel economy and maintaining particulate emissions below a threshold of an engine system in a vehicle. An engine system has port fuel injection, direct injection, variable compression ratio, and independent compression/expansion. A processor predicts settings for the four systems that optimize for a fuel economy that is maximized. A particulate rate of the engine system is computed based on the settings. A determination is made of whether the particulate rate is below a threshold. When the particulate rate is below the threshold, command signals are delivered to actuators of the systems to move to the settings. When the threshold is exceeded, the settings are revised to maintain the particulate below the threshold while optimizing for fuel economy.

20 Claims, 3 Drawing Sheets

(56) References Cited

U.S. PATENT DOCUMENTS

| | | |
|---|---|---|
| 8,498,799 B2 | 7/2013 | Matthews, Jr. et al. |
| 8,706,383 B2 | 4/2014 | Sauve et al. |
| 9,169,789 B2 | 10/2015 | Cowgill et al. |
| 9,347,381 B2 | 5/2016 | Long et al. |
| 9,441,570 B2 * | 9/2016 | Cohn .................... F02P 5/1506 |
| 9,541,019 B2 | 1/2017 | Verdejo et al. |
| 10,125,679 B2 | 11/2018 | Zahdeh |
| 10,167,809 B1 | 1/2019 | Domenech-Llopis et al. |
| 10,787,973 B2 | 9/2020 | Heinbuch et al. |
| 11,092,090 B1 | 8/2021 | Balding |

* cited by examiner

PORT-DIRECT INJECTION ENGINE METHODS AND SYSTEMS OPTIMIZING FUEL ECONOMY WITH PARTICULATE CONTROL

INTRODUCTION

The present disclosure generally relates to optimizing control of an internal combustion engine of a vehicle, and more specifically to methods and systems for controlling port-direct injection ratios, variable compression ratios and independent compression/expansion rates of an engine for fuel economy optimization and particulate control.

Internal combustion engines may include fuel injectors that inject fuel at specific locations for mixing with intake air stream to produce an air/fuel mixture. Various types of fuel injection system may be used including port fuel injection (PFI) systems and direct injection (DI) systems. In a PFI system, fuel is injected into the intake manifold, such as in a runner, for introduction to the intake airstream before reaching the engine's intake valves and cylinders. When travelling past an open intake valve, the fuel is already mixing with the air as the intake stream enters the engine's cylinders. In a DI system, the injectors are placed to inject fuel directly into the engine's cylinders for mixing with the intake air after the air has passed an open intake valve and entered a cylinder. With PFI, fuel may be injected under a significantly lower pressure than with DI since it is introduced into the air as it is being drawn into the engine's cylinders, rather than directly into a cylinder.

In some applications, an engine may be equipped with both a PFI system and a DI system in a dual port-direct injection (PDI) system to take advantage of both types of injection systems. Controlling both systems simultaneously may be complex, especially when combined with other advanced engine systems. When an engine also includes PDI and other advanced engine systems, new control approaches are needed.

Accordingly, it is desirable to provide methods and systems for controlling engines, including those with both PFI and DI systems and other advanced engine systems. Furthermore, other desirable features and characteristics of the present disclosure will become apparent from the subsequent detailed description and the appended claims, taken in conjunction with the accompanying drawings and the foregoing introduction.

SUMMARY

Methods and systems for optimizing fuel economy and maintaining particulate emissions below a threshold of an engine system in a vehicle are provided. In a number of embodiments, a method is provided for an engine system that has port fuel injection, direct injection, a variable compression ratio system, and an independent compression/expansion system. A processor predicts settings for the four systems that optimize for maximum fuel economy. A particulate rate of the engine system is computed based on the settings. A determination is made of whether the particulate rate is below a threshold. When the particulate rate is below the threshold, command signals are delivered to actuators of the four systems to move to the settings.

In additional embodiments, when the particulate threshold is exceeded, the settings are revised to maintain the particulate rate below the threshold, while optimizing for fuel economy.

In additional embodiments, predicting the settings includes predicting the settings for a requested speed and torque of the engine system.

In additional embodiments, the particulate rate for the engine system in a vehicle operating at various loads is mapped by testing.

In additional embodiments, the processor receives a load request of the engine system, where predicting the settings is based on the load request. Computing the particulate rate is carried out based on the load request.

In additional embodiments, the settings are determined to optimize the fuel economy on a model predictive control model. The particulate rate is prioritized over the fuel economy to ensure the particulate rate is below the threshold, while optimizing the fuel economy.

In additional embodiments, revising includes applying relative weights to the ratio of the port fuel injection system to the direct injection system, the variable compression ratio system, and the independent compression/expansion system, to prioritize an order of their revision.

In additional embodiments, the processor evaluates adjustments to a multi-link cranktrain of the engine system to predict the variable compression ratio system, and the independent compression/expansion system.

In additional embodiments, the processor evaluates adjustments to cam phasers of the engine system to predict the variable compression ratio system and the independent compression expansion system.

In additional embodiments, the actuators include at least one port fuel injector, a set of direct injectors, and a crank actuator. The command signals move the port fuel injector, the set of direct injectors, and the crank actuator to states corresponding to the settings.

In a number of other embodiments, a system is provided for controlling an engine system that includes a port fuel injection system, a direct injection system, a variable compression ratio system and independent compression/expansion system in the engine system. A processor is in communication with the engine system and is configured to predict settings for a ratio of the port fuel injection system to the direct injection system, the variable compression ratio system, and the independent compression/expansion system that optimize for a maximum fuel economy. A particulate rate of the engine system is computed based on the settings. A determination is made as to whether the particulate rate is below a maximum threshold. When the particulate rate is below the maximum threshold, command signals are sent to actuators of the engine system to adjust the ratio of the port fuel injection system to the direct injection system, the variable compression ratio system, and the independent compression/expansion system to the settings, optimizing for the fuel economy that is maximized. Adjustment of the actuators is initiated based on the command signals.

In additional embodiments, the processor is configured to, when the particulate rate is not below the maximum threshold, revise the settings for the ratio of the port fuel injection system to the direct injection system, the variable compression ratio system, and the independent compression/expansion system to maintain the particulate rate below the maximum threshold. Optimizing for the fuel economy that is maximized is limited by maintaining the particulate rate below the maximum threshold.

In additional embodiments, the processor is configured to predict the settings based a requested speed and torque of the engine system.

In additional embodiments, the engine system is disposed in a vehicle. The processor is configured to determine whether the particulate rate is below a maximum threshold based on a mapping of the particulate rate for the engine system in the vehicle operating at various loads.

In additional embodiments, the processor is configured to receive a load request of the engine system, predict the settings based on the load request, and compute the particulate rate based on the load request.

In additional embodiments, the processor is configured to determine the settings to optimize the fuel economy on a model predictive control model.

In additional embodiments, the processor is configured to revise the settings by applying relative weights to the ratio of the port fuel injection system to the direct injection system, the variable compression ratio system, and the independent compression/expansion system to prioritize an order of their revision.

In additional embodiments, a multi-link cranktrain is included in the engine system. The processor is configured to evaluate adjustments to the multi-link cranktrain to predict the variable compression ratio system, and the independent compression/expansion system.

In additional embodiments, cam phasers are included in the engine system. The processor is configured to evaluate adjustments to the cam phasers to predict the variable compression ratio system, and the independent compression/expansion system.

In a number of additional embodiments, a system is provided for controlling an engine system of a vehicle that includes a port fuel injection system, a direct injection system, a variable compression ratio system, and independent compression/expansion system in the engine system. A processor is in communication with the engine system. The processor predicts settings for a ratio of the port fuel injection system to the direct injection system, the variable compression ratio system, and the independent compression/expansion system that optimize for a maximum fuel economy of the engine system in the vehicle. The processor computes a particulate rate of the engine system in the vehicle based on the settings. Computing the particulate rate is based on a mapping of various particulate rates of the engine system in the vehicle. Whether the particulate rate is below a maximum threshold is determined. When the particulate rate is below the maximum threshold, command signals to actuators of the engine system are determined to adjust the ratio of the port fuel injection system to the direct injection system, the variable compression ratio system, and the independent compression/expansion system to the settings, optimizing for the fuel economy that is maximized. When the particulate rate is not below the maximum threshold, the settings are revised for the ratio of the port fuel injection system to the direct injection system, the variable compression ratio system, and the independent compression/expansion system to maintain the particulate rate below the maximum threshold, where optimizing for maximum fuel economy is limited by maintaining the particulate rate below the maximum threshold; generate, when the particulate rate is not below the maximum threshold, revised command signals to actuators; reject the command signals, only when revised command signals are generated; and initiate adjustment of the actuators, based on one of the command signals and the revised command signals.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
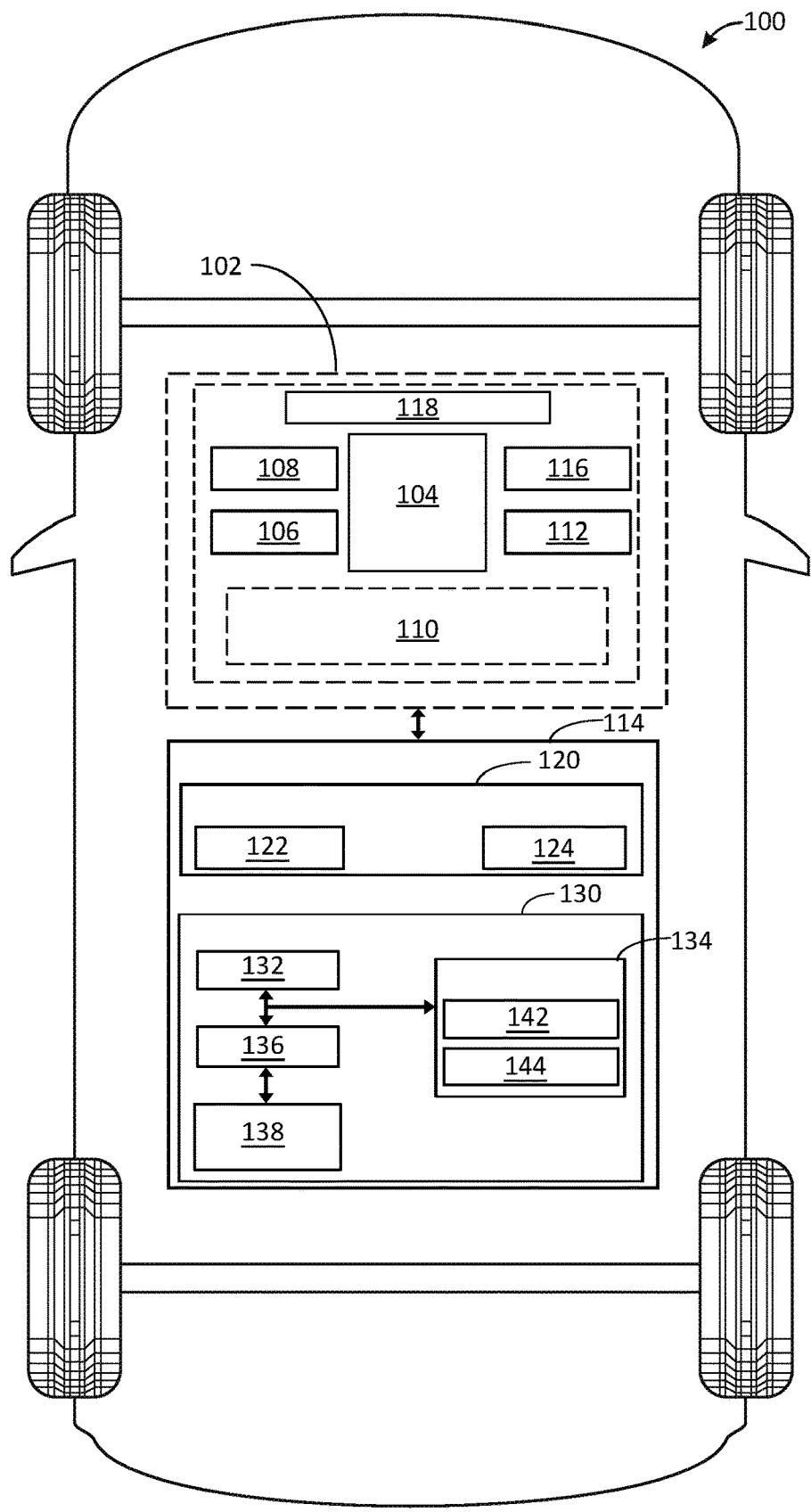
FIG. 1 is a functional diagram of a vehicle that includes a drive system having a particulate filter and a control system, in accordance with an exemplary embodiment.

Referring to FIG. 1, illustrated is a vehicle 100, having an engine system 102 according to an exemplary embodiment. In various embodiments, the engine system 102 includes an engine 104 controlled to optimize fuel economy and particulate emission based on the requested load. The requested load may be based on a driver or autonomous input for torque and/or speed. In certain embodiments, the vehicle 100 comprises an automobile. As will be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a truck, a watercraft, an aircraft, and/or one or more other types of vehicles. In addition, in various embodiments, it will also be appreciated that the vehicle 100 may comprise any number of other types of mobile platforms with an engine system such as the engine system 102.

In the depicted embodiment, the vehicle 100 includes a body that substantially encloses other components of the vehicle 100. Also in the depicted embodiment, the vehicle 100 includes a plurality of axles and wheels. The wheels are each rotationally coupled to one or more of the axles near a respective corner of the body to facilitate movement of the vehicle 100. In one embodiment, the vehicle 100 includes four wheels, although this may vary in other embodiments (for example for trucks and certain other vehicles).

The vehicle 100 further includes a control system 114 associated with the engine system 102 and with other systems of the vehicle 100. The engine system 102 drives the vehicle wheels to rotate in a forward direction or a backward direction. The engine system 102 generally includes a number of components and subsystems including an engine 104, a fuel system 106, an intake system 108, an exhaust system 110, an ignition system 112, and a valve system 116. In various embodiments, the engine system 102 is a four stroke internal combustion engine in which a piston in each cylinder completes an intake stroke, a compression stroke, a combustion stroke, and an exhaust stroke to drive the engine 104. The intake system 108 delivers air and controls the air's mass flow rate to the cylinders via a throttle. The fuel system 106 delivers fuel to the cylinders and controls its timing and amount via a number of injectors as further described below. The valve system 116 includes a number of valves to control the flow of air/gases into and out of the cylinders. The ignition system 112 is operated to control the timing of, and initiate, combustion in the cylinders. The exhaust system 110 conveys combustion gases from the engine 104 to the atmosphere and may include aftertreatment devices.

In this embodiment, the engine 104 is configured as a PDI engine with variable compression ratio (VCR) and independent compression/expansion. As such, the engine 104 includes an actuator system 118 responsive to a controller 130 of the control system 114 to carry out these and other functions. In the VCR operation, the compression ratio (CR) and the expansion ratio (ER) of each cylinder (i.e., a ratio of a cylinder volume when the piston is at bottom-dead-center (BDC) to a cylinder volume when the piston is at top-dead-center (TDC)) may be altered as further described below. In the independent compression/expansion operation, the compression stroke length may be selectively altered from the expansion stroke length also as further described below.

In various embodiments, the VCR ratios may be varied between a first, lower ratio where the ratio of the cylinder volume when the piston is at BDC to the cylinder volume when the piston is at TDC is smaller and a second, higher ratio where the ratio is higher. In various other embodiments, there may be predefined number of stepped compression ratios between the first, lower ratio and the second, higher ratio. Further still, the ratio may be continuously variable between the first, lower ratio and the second, higher ratio (to any ratio in between). In various embodiments, the ratio may be varied independently, for each cylinder, during the compression strokes of the cylinder and during the expansion strokes of the cylinder. In various embodiments, the compression stroke length may be selectively varied from the expansion stroke length, including at high torque, high speed operating conditions and low torque low speed operating conditions of the engine system 102 providing benefits such as optimizing/maximizing fuel economy of the vehicle 100. As further described below, the variation may be effected mechanically or effectively.

In various embodiments, the independent compression/expansion operation may independently vary the compression ratio relative to the expansion ratio. The volume of a cylinder with the piston at BDC of the its travel on the compression stroke, divided by the volume of the cylinder at TDC of the compression stroke, equals compression ratio. The volume of the cylinder at BDC of the combustion stroke, divided by the volume of the cylinder at TDC of the combustion stroke equals expansion ratio. In the current embodiment, the engine 104 is not mechanically limited to having the same stroke length for compression and expansion operation. The compression ratio may be controlled to be different from the expansion ratio by an actuator of the actuator system 118 via a mechanically variable cranktrain as further described below.

In various embodiments, the control system 114 provides instructions for controlling various aspects of the vehicle 100 including for controlling the engine system 102. In various embodiments, the control system 114 comprises an engine control unit (ECU) for the engine system 102. Also in various embodiments, among other functionality, the control system 114 selectively controls operation of the PDI, VCR and independent compression/expansion to achieve optimized fuel economy and particulate emissions while achieving desired torque and speed outputs. In various embodiments, the control system 114 provides these functions in accordance with the steps of the process 300 described further below in connection with the FIG. 3.

As depicted in FIG. 1, in various embodiments, the control system 114 includes a sensor array 120 and the controller 130. In various embodiments, the sensor array 120 includes sensors for measuring observable conditions, including of the engine system 102, and generating sensor data based thereon. As depicted in FIG. 1, in various embodiments, the sensor array 120 includes one or more engine sensors 122. In various embodiments, the engine sensors 122 are attached to, disposed within, or otherwise disposed in proximity to the engine system 102 such that various temperatures, positions, speeds, and other observable parameters are measured. In certain embodiments, the sensor array 120 may also include one or more other sensors 124, for example for operation of the engine 104 and/or of other systems and devices of the vehicle 100. For example, in certain embodiments, the other sensors 124 may include one or more ignition sensors for detecting when the engine 104 is turned on and/or running, one or more load sensors, such as a throttle position sensor, for detecting load requests of the engine 104, and other sensors as desired.

In various embodiments, the controller 130 is coupled with the sensor array 120, and provides instructions for controlling the engine system 102 (including controlling the PDI system, the VCR system, and the independent compression/expansion system) via commands based on the sensor data. As depicted in FIG. 1, the controller 130 comprises a computer system. In certain embodiments, the controller 130 may also include the sensor array 120 and/or one or more other vehicle components. In addition, it will be appreciated that the controller 130 may differ from the embodiment depicted in FIG. 1. For example, the controller 130 may be coupled with or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 140. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130 and the computer system of the controller 130, generally in executing the processes described herein, such as the process 300 discussed further below in connection with FIG. 3.

The memory 134 may be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 (e.g., including, in various embodiments, predetermined threshold values for controlling particulate emissions).

The bus 140 serves to transmit programs, data, status and other information or signals between the various components of the computer system of the controller 130. The interface 136 allows communications with the computer system of the controller 130, for example from a system driver and/or another computer system, and is implemented using any suitable method and apparatus. In one embodiment, the interface 136 obtains the various data from the sensor array 120, the engine system 102, and/or one or more other components and/or systems of the vehicle 100. The interface 136 may include one or more network interfaces to communicate with other systems or components. The interface 136 may also include one or more network interfaces to communicate with technicians, and/or one or more storage interfaces to connect to storage apparatuses, such as the storage device 138.

The storage device 138 may be any suitable type of storage apparatus, including various different types of direct access storage and/or other memory devices. In one exemplary embodiment, the storage device 138 comprises a program product from which the memory 134 receives a program 142 that executes one or more embodiments of one or more processes of the present disclosure, such as the steps of the process 300 discussed further below in connection with FIG. 3. In another exemplary embodiment, the program product may be directly stored in and/or otherwise accessed by the memory 134 and/or the storage device 138 and/or other memory devices.

The bus 140 may be any suitable physical or logical means of connecting computer systems and components. This includes, but is not limited to, direct hard-wired connections, fiber optics, infrared, and wireless bus technologies. During operation, the programs 142 are stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

Figure 2:
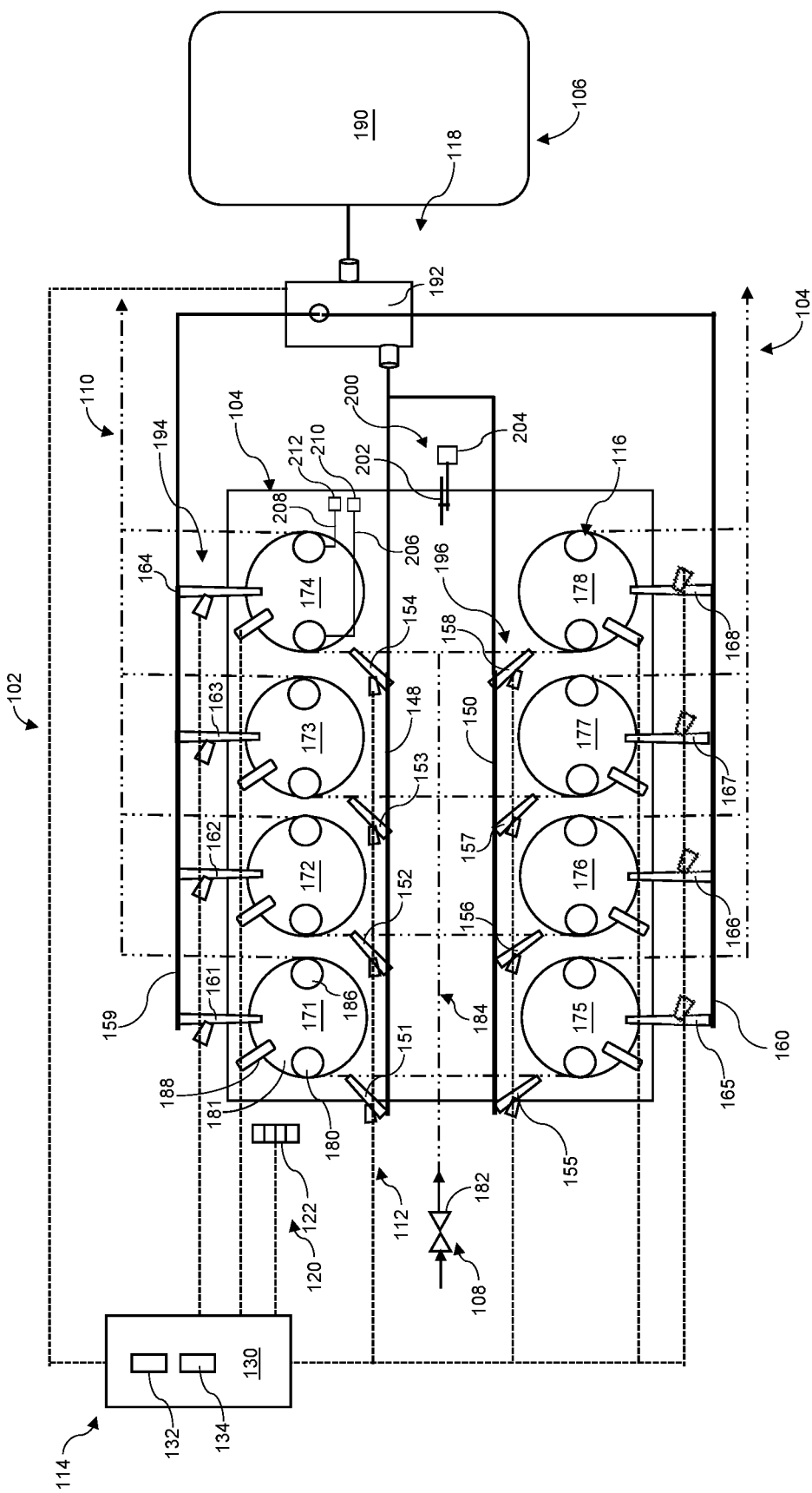
FIG. 2 is a functional diagram illustrating the engine system of the vehicle of FIG. 1 having a port-direct fuel injector system with both port fuel injection and direct injection, variable compression ratios and independent compression/expansion in accordance with an exemplary embodiment.

With reference to FIG. 2, the engine system 102 is shown in greater detail. In various embodiments, the engine system 102 may be specifically associated with the vehicle 100, however, the current disclosure is not limited to vehicle applications. In general, the engine system 102 includes the engine 104, the fuel system 106, the intake system 108, the exhaust system 110, the ignition system 112, the valve system 116, the actuator system 118, and includes or is associated with the control system 114.

The engine 104 includes a number of cylinders 171-178 containing pistons, for example piston 181 in cylinder 171. In the current embodiment, the engine 104 includes the eight cylinders 171-178. In other embodiments any number of individual cylinders may be employed. In the valve system 116, each of the cylinders 171-178, for example cylinder 171, is associated with one or more intake valve(s), such as intake valve 180, through which air from the intake system 108 is selectively admitted to the respective cylinder 171. The intake system 108 includes a valve, such as a throttle body valve 182, the controlled position of which determines the amount of air delivered to the engine 104, such as based on driver load request inputs. The incoming air is routed through an intake manifold 184. Also in the valve system 116, each cylinder 171-178, for example cylinder 171, is associated with one or more exhaust valve(s), such as exhaust valve 186, through which gases from the cylinders 171-178 are selectively delivered to the exhaust system 110 for discharge. The exhaust system 110 may include a number of additional components (not shown), for monitoring and managing the exhaust gases.

The ignition system 112 includes a spark plug in each of the cylinders 171-178. For example, a spark plug 188 is included in the cylinder 171. As such, the engine 104 is a spark ignition engine. In other embodiments, another form of combustion initiation, such as compression ignition may be employed. The ignition system 112 may include a number of additional components (not shown), such as an ignition switch, a battery, an ignition module, a coil or coils, and various sensors.

The fuel system 106 includes a fuel source, such as a fuel tank 190, one or more pump(s) 192, a PFI system 194, and a DI system 196. The PFI system 194 includes fuel rails 148 and 150, which may be interconnected with each other and that are coupled with the pump(s) 192. In addition, the PFI system 194 includes PFI injectors 151-158, each one of which is associated with a respective cylinder 171-178. Each of the PFI injectors 151-158 is disposed in the air intake system 108, such as in the intake manifold 184 to inject fuel upstream of the cylinders 171-178, such as in a runner or mixing chamber. The DI system 196 includes fuel rails 159 and 160, which may be interconnected with each other and that are coupled with the pump(s) 192. In addition, the DI system 196 includes DI injectors 161-168, each one of which is associated with a respective cylinder 171-178. Each of the DI injectors 161-168 is disposed in a cylinder 171-178 respectively, to inject fuel directly into the respective cylinder 171-178.

The pump(s) 192 are configured to supply fuel at different pressures. The pump(s) 192 supply a relatively low pressure fuel flow to the PFI fuel rails 148, 150, and supply a relatively high pressure fuel flow to the DI fuel rails 159, 160. Relatively low pressure means the pressure supplied to the PFI fuel rails 148, 150 is lower than the fuel pressure supplied to the DI fuel rails 159, 160 and is sufficient to support fuel injection into the intake manifold 184 by the PFI injectors 151-158. The relatively high fuel pressure supplied to the DI injectors is higher relative to the PFI pressure and is sufficient to support fuel injection directly into the cylinders 171-178 by the DI fuel injectors 161-168. The fuel system 106 may include a number of additional components (not shown) such as regulators, valves, and various sensors. The pump(s) 192 may be configured as one unit as shown, or may be constructed as two or more units. For example, the PFI fuel rails 148, 150 may be supplied directly by a pump in the fuel tank 190, or may be supplied by such as pump and routed as a pass through via the pump(s) 192, with the pump(s) 192 separately supplying higher pressure for the DI fuel rails 159, 160. The port-direct-injection ratio (PDI ratio) is the ratio of fuel injected through the PFI injectors 151-158 to the fuel injected through the DI injectors 161-168. A model or mapping of engine 104 operating parameters at various PDI ratios for the engine system 102 may be determined based on characteristic testing and/or modelling of the engine system 102 at various loads.

The engine 104 includes a cranktrain 200, which may be a multilink cranktrain or a bent rod cranktrain with a linkage 202 and crank actuator(s) 204 for mechanically altering the compression ratio, the expansion ratio and/or the relative length of the compression strokes and the expansion strokes of the pistons, such as piston 181. For example, the ratio of the engine 104 may be varied via movement of the linkage 202 by operation of the crank actuator(s) 204, which changes piston position or changes a cylinder head volume (that is, the clearance volume in the cylinder head). In another example, the varying may be hydraulic pressure-reactive, air pressure-reactive, or mechanically reactive, or other variable compression/expansion ratio/stroke mechanizations to change the stroke length of the pistons (e.g., piston 181) for variable compression ratios and/or to vary the compression stroke length relative to the expansion stroke length in the four-cycle operation. A model or mapping of engine 104 operating parameters at various settings of the crank actuator(s) 204 for the engine system 102 may be determined based on characteristic testing and/or modelling of the engine system 102 at various loads.

The cylinder bank 171-174 of the engine 104 includes intake and exhaust camshafts 206, 208 respectively, as part of the valve system 116 with phasers (camshaft actuators) 210, 212 respectively. The intake camshaft 206 operates the intake valves (e.g., intake valve 180), and the exhaust camshaft 208 operates the exhaust valves (e.g., exhaust valve 186). It will be appreciated that two additional camshafts (not shown) are included at the cylinder bank 175-178. In other embodiments, only two total camshafts with two phasers may be included, such as in a single overhead cam or other arrangement. The phaser 210 is controlled by the controller 130 via the processor 132 to achieve a target intake camshaft 206 angle and the phaser 212 is controlled by the controller 130 via the processor 132 to achieve a target exhaust camshaft 208 angle. A model or mapping of engine 104 operating parameters at various settings of the phasers 210, 212 for the engine system 102 may be determined based on characteristic testing and/or modelling of the engine system 102 at various loads.

In certain embodiments, rather than mechanically adjusted relative piston strokes and compression ratios via the cranktrain 200, effective compression ratios and relative stroke lengths may be achieved through timing of the valve operations in the valve system 116 using the phasers 210, 212. For example, varying valve timing provides an effective compression ratio adjustment by changing the amount of piston stroke that is utilized when a given valve is open. The amount of a piston stroke that is utilized may be reduced by opening a respective valve during only a portion of the corresponding piston's stroke, rather than for the full stroke. Also for example, independent compression and expansion may be effectively provided while the mechanical stroke lengths of compression and expansion are the same. The processor 132 may effectively change the compression ratio and/or expansion ratio without changing the physical stroke of the engine 104. For example, via the phaser 210, the intake valve 180 may be kept open during part of the compression stroke to vent some of intake charge and the processor 132 may effect closure of the intake valve 180 to compress the charge in the cylinder 171, effectively lowering the compression ratio.

The exhaust system 110 conveys combustion gases from the engine 104 to the atmosphere and may include aftertreatment devices such as a catalytic converter and/or particulate filter (not shown). For example, the exhaust system 110 directs the exhaust gases through the aftertreatment devices and on to atmosphere through, for example, a tailpipe. The aftertreatment devices may be arranged in any of several different configurations. Particulate constituents of the exhaust gas stream may be minimized by the catalytic converter and/or particulate filter. For example, a three-way catalytic converter is designed for converting hydrocarbons, carbon monoxide and nitrogen oxides to innocuous constituents and the particulate filter is designed to trap and consume particulate matter. In embodiments as further described below, selective operation of the engine 104 may be beneficially used to achieve particulate emission targets, including without the need for a particulate filter.

The control system 114 includes the controller 130, which is coupled with the sensor array 120, including with the engine sensors 122, and is coupled with the actuator system 118. The controller 170 may receive information in signals from the various sensors of the sensor array 120, process that information, and send control signals/commands to the various actuators of the actuator system 118 for operation of the engine system 102.

The sensor array 120 senses observable conditions of the engine system 102. In various embodiments, the sensed values include data associated with the engine 104, the fuel system 106, the intake system 108, the exhaust system 110, the ignition system 112, and the valve system 116, and the actuator system 118. For example, the sensor array 120 includes sensors provided as part of the throttle body valve 182, the PFI injectors 151-158, the DI injectors 161-168, the ignition system 112, the pump(s) 192, and also include the engine sensors 122. The sensors referenced collectively as the engine sensors 122 may include those that monitor mass airflow, intake manifold absolute pressure, intake air temperature, engine coolant temperature, engine speed, exhaust gas temperature, and/or exhaust gas oxygen concentration, accelerator pedal position, and other conditions useful for operation of the engine system 102.

The various actuators include the PFI injectors 151-158, the DI injectors 161-168, the throttle body valve 182, the pump(s) 192, the spark plugs (e.g. 188), the fuel pump(s) 192, the crank actuator(s) 204 and the cam phasers 210, 212. It will be appreciated that operation of the engine system 102 may entail use of a number of other actuators responsive to the controller 130 that are not illustrated or described for purposes of the current disclosure.

Figure 3:
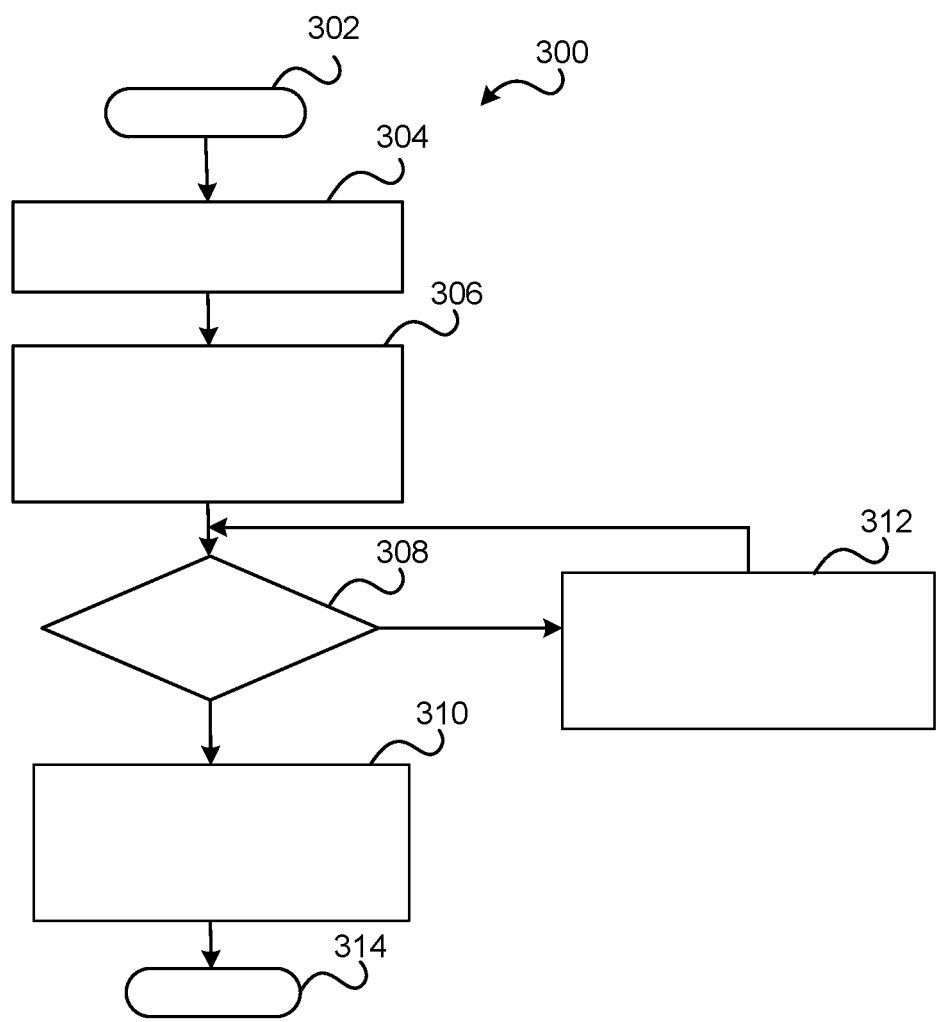
FIG. 3 is a flowchart of a process for optimizing fuel economy and particulates in connection with the vehicle and the control system of FIG. 1 and the engine system of FIG. 2, in accordance with an exemplary embodiment.

With reference to FIG. 3, a flowchart illustrates a process 300 for controlling operation of the engine system 102 of FIGS. 1 and 2 in accordance with exemplary embodiments. As will be appreciated in light of this disclosure, the order of operations within the process 300 is not limited to the sequential execution as illustrated in FIG. 3, and may be performed in one or more varying orders as applicable and in accordance with the present disclosure. In additional embodiments, additional steps may be included in the process 300 and/or some steps may be omitted from the process 300.

In various embodiments, the process 300 may be implemented in connection with the vehicle 100 of FIG. 1 and the engine system 102 of FIG. 2, including the control system 114 and the engine 104 and other systems thereof. As depicted in FIG. 3, the process 300 may begin at 302. In certain embodiments, the process 300 begins 302 when one or more events occur to indicate that operation of the vehicle 100 is taking place or about to take place, such as a driver, operator, or passenger entering the vehicle 100, the engine 104 being turned on, a transmission of the vehicle 100 being placed in a "drive" mode, or the like. In various embodiments, the event(s) triggering the starting of the process 300 are determined based on sensor data from one or more of the other sensors 124 of FIG. 1 (e.g., from ignition sensors in certain embodiments). Also in certain embodiments, the control system 114 is turned on, or "woken up" as part of begin step 302.

The process 300 then monitors the torque/speed requests of the engine 104 as may be indicated by the sensor array 120, such as by sensors provided as part of the throttle body valve 182 and/or other sensors. The monitoring may be a part of the begin step 302 and/or the step 304, or another step. The requested load (torque and/or speed) requires operation of the engine 104 and its related systems to match the request. The process 300 predicts 304 an optimum fuel economy achievable by setting the PFI system 194, the DI system 196, and the crank actuator(s) 204 to accomplish a PDI ratio, a VCR, and relative and independent compression/expansion strokes for the highest fuel economy of the vehicle 100 with the engine 104 operating at a load to achieve the requested torque/speed. As such, settings for the PFI system 194, the DI system 196, the VCR system, and the independent compression/expansion system are optimized for maximum fuel economy. In various embodiments, the control signals are generated by one or more proportional-integral-derivative (PID) controllers or model predictive controllers (MPC) that utilize trained models to achieve the lowest fuel consumption at the given load request. In embodiments, the controllers may carry out computations, may utilize mappings, and may run scenarios to optimize fuel economy through the setting of the PDI ratio, VCR and independent compression/expansion strokes. The optimum PDI ratio, VCR and independent compression/expansion strokes for the maximum fuel economy is learned/stored for the particular engine system 102 in the particular vehicle 100. In other words, the optimum settings are calibrated for a specific vehicle configuration.

In embodiments, the MPC determines predicted responses of the engine 104 for the target torque/speed values for possible sequences of settings for PDI ratio, VCR and independent compression/expansion strokes based on a model of the engine 104, which may be created using commercially available computational software for high-fidelity simulations verified by targeted testing, stored data, and inputs from the sensor array 120. In embodiments, the model may be a function or mapping calibrated based on characteristics of the engine 104 in the vehicle 100. The sequences relate to actuator settings, such as of the PFI injectors 151-158, the DI injectors 161-168, and the crank actuator(s) 204. In additional embodiments, settings of the phasers 210, 212 and the ignition system 112 are contemplated.

Based on the PDI ratio, VCR and independent compression/expansion stroke combination predicted 304 to achieve the lowest fuel consumption at the given load, the process 300 computes 306 a particulate rate that would be generated by the engine 104 and delivered to the exhaust system 110 at those predicted 304 settings. The computation 306 may involve looking up particulate rates use a mapping developed for the engine 104 in the vehicle 100. As such, the particulate rate computation is specific to the arrangement and characteristics of the vehicle 100. For example, the mapping may be developed by running the vehicle 100 with the engine 104 on a dynamometer and measuring particulate emissions at various sequences of PDI ratio, VCR and independent compression/expansion strokes. The resulting data is organized and may be stored in the storage device 138 and/or the memory 134 for access and use by the processor 132 in completing the computation 306.

The process 300 determines 308 whether the computed 306 particulate rate is below a threshold valve for particulates. For example, the threshold value may be one milligram per mile of travel of the vehicle 100. The threshold value may be a particulate emission rate below which operation of the engine 104 is controlled, while still optimizing fuel economy. Accordingly, when the computed 306 particulate rate is below the threshold value, the process 300 proceeds to command 310 the PDI ratio, VCR and independent compression/expansion strokes that achieves the lowest (optimized) fuel consumption as predicted 304 delivering the corresponding control signals for setting the PFI system 194, the DI system 196, and the crank actuator(s) 204. As noted above, in other embodiments, the control signals may command settings for the phasers (e.g., 210, 212) and/or the ignition system 112.

When the determination 308 is negative, meaning the computed 306 particulate rate based on the prediction 304 is not below the threshold, the process 300 proceeds to revise 312 the PDI ratio, the VCR and/or the independent compression/expansion strokes to new setting values that will bring the particulate rate below the threshold. The computation 306 may be carried out iteratively, making minimal adjustments and repeating the determination 308 to bring the particulate rate under the threshold. Variation of the any or all of the control options may be prioritized. For example, variation of the PDI ratio may be carried out first to attempt to bring the particulate rate under the threshold at the given load before variations to the cranktrain 200 are evaluated in the revision 312. In embodiments, the PDI ratio may be skewed heavier toward PFI than the prediction 304 to reduce particulates with some lowering of fuel economy. PDI ratios may include values from zero to one-hundred and all values in-between may be selected where zero is 0% PDI/100% DI and 100 is 100% PDI/0% DI. In the present example, the signals to the DI injectors 161-168 are set toward zero-percent PWM and the controller 130 maintains the DI injectors 161-168 in a partially closed or in a closed state (less or no fuel flow). Toward or at 100% PDI ratio, further control of the engine 104 is simplified because only one revision of the settings is required or only one set of injectors (DI injectors 161-168) are operating at 100% PDI ratio, and taking this approach may accomplish generating no levels of particulate matter above the maximum threshold with no further changes required. In other examples, further variations, such as to the VCR system and/or the independent compression/expansion system may be undertaken to avoid excursions above the particulate threshold.

In some embodiments, scenarios of varying the cam phasers 210, 212 may be comprehended to change effective compression rates relative strokes, rather than using the cranktrain 200 to effect mechanical changes. In embodiments, scenarios varying the fuel injection strategy may be used. For example, the use of multiple injections, injection timing variations, and/or injection pressure variations may be evaluated in the revision 312. In some embodiments, scenarios of varying the timing of the spark plugs of the ignition system 112 may be evaluated. Through the various scenario options, the MPC always optimizes fuel economy while maintaining particulate emissions below the threshold. When the maximum achievable fuel economy would result in not maintaining particulate emissions below the threshold, the MPC selects settings that result in particulate emissions below the threshold with optimized (though not maximum possible irrespective of particulate rate), fuel economy.

Following the revision 312, when the determination 308 is positive, the process 300 proceeds to command 310, via control signals from the processor 132, the PDI ratio, VCR and independent compression/expansion strokes that achieves particulate rates below the threshold with optimized fuel consumption as revised 312, delivering the corresponding control signals for setting the PFI system 194, the DI system 196, and the crank actuator(s) 204 of the VCR system and the independent compression/expansion system. The predicted 304 commands 310 are rejected and not effected when the revision 312 occurs. In embodiments, the commands 310 include various combinations of control signals for setting the strategy of the PFI injectors, the DI injectors, the crank actuator(s) 204, the phasers 210, 212, and/or the spark plugs (e.g., spark plug 188). The controller 130 generates control signals for the actuator system 118 that optimizes fuel economy, maintains particulate emissions below the threshold and causes the engine 104 to generate the requested speed/torque. From the command 310 step, the process 300 may return to begin 302 whenever the engine 104 is operating and may run continuously responding to changes in requested load until the engine 104 is shut down at which point the process 300 ends 314. For example, every load (torque/speed) change of the engine 104 may lead to new settings for the PDI ratio, VCR, and independent compression/expansion strokes through the process 300.

Accordingly, systems and methods provide optimized fuel economy and maintain particulate emissions below a threshold by setting the PDI ratio, the VCR and the independent compression/expansion strokes on an engine in a vehicle. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an engine system that has a port fuel injection system, a direct injection system, a variable compression ratio system and an independent compression/expansion system, the method comprising:
    predicting, by a processor, settings for each of a ratio of the port fuel injection system to the direct injection system, the variable compression ratio system, and the independent compression/expansion system that optimize for a fuel economy that is maximized;
    computing, by the processor, a particulate rate of the engine system based on the settings;
    determining, by the processor, whether the particulate rate is below a maximum threshold;
    generating, by the processor and when the particulate rate is below the maximum threshold, command signals to actuators of the engine system to adjust the ratio of the port fuel injection system to the direct injection system, the variable compression ratio system, and the independent compression/expansion system to the settings, optimizing for the fuel economy that is maximized; and
    initiating, by the processor, adjustment of the actuators, based on the command signals.

2. The method of claim 1, comprising, revising, by the processor and when the particulate rate is not below the maximum threshold, the settings for the ratio of the port fuel injection system to the direct injection system, the variable compression ratio system, and the independent compression/expansion system to maintain the particulate rate below the maximum threshold, wherein the optimizing for the fuel economy that is maximized is limited by maintaining the particulate rate below the maximum threshold.

3. The method of claim 1, wherein the predicting the settings includes predicting the settings for a requested speed and torque of the engine system.

4. The method of claim 1, comprising mapping, by testing, the particulate rate for the engine system in a vehicle operating at various loads.

5. The method of claim 1, comprising receiving, by the processor, a load request of the engine system, wherein the predicting the settings is based on the load request; and wherein the computing the particulate rate is carried out based on the load request.

6. The method of claim 1, comprising:
    determining the settings to optimize the fuel economy on a model predictive control model; and
    prioritizing the particulate rate over the fuel economy to ensure the particulate rate is below the threshold, while optimizing the fuel economy.

7. The method of claim 1, wherein the revising includes applying relative weights to the ratio of the port fuel injection system to the direct injection system, the variable compression ratio system, and the independent compression/expansion system to prioritize an order of their revision.

8. The method of claim 1, comprising evaluating, by the processor, adjustments to a multi-link cranktrain of the engine system to predict the variable compression ratio system, and the independent compression/expansion system.

9. The method of claim 1, comprising evaluating, by the processor, adjustments to cam phasers of the engine system to predict the variable compression ratio system and the independent compression expansion system.

10. The method of claim 1, wherein the actuators include at least one port fuel injector, a set of direct injectors, and a crank actuator, and comprising, moving, via the command signals, the at least one port fuel injector, the set of direct injectors, and the crank actuator to states corresponding to the settings.

11. A system for controlling an engine system comprising:
a port fuel injection system, a direct injection system, a variable compression ratio system and an independent compression/expansion system in the engine system; and
a processor in communication with the engine system and configured to:
predict settings for a ratio of the port fuel injection system to the direct injection system, the variable compression ratio system, and the independent compression/expansion system that optimize for a fuel economy that is maximized;
compute a particulate rate of the engine system based on the settings;
determine whether the particulate rate is below a maximum threshold;
generate, when the particulate rate is below the maximum threshold, command signals to actuators of the engine system to adjust the ratio of the port fuel injection system to the direct injection system, the variable compression ratio system, and the independent compression/expansion system to the settings, optimizing for the fuel economy that is maximized; and
initiate adjustment of the actuators, based on the command signals.

12. The system of claim 11, wherein the processor is configured to, when the particulate rate is not below the maximum threshold, revise the settings for the ratio of the port fuel injection system to the direct injection system, the variable compression ratio system, and the independent compression/expansion system to maintain the particulate rate below the maximum threshold, wherein the optimize for the fuel economy that is maximized is limited by maintaining the particulate rate below the maximum threshold.

13. The system of claim 11, wherein the processor is configured to predict the settings based on a requested speed and torque of the engine system.

14. The system of claim 11, wherein the engine system is disposed in a vehicle, wherein the processor is configured to determine whether the particulate rate is below a maximum threshold based on a mapping of the particulate rate for the engine system in the vehicle operating at various loads.

15. The system of claim 11, wherein the processor is configured to:
receive a load request of the engine system;
predict the settings based on the load request; and
compute the particulate rate based on the load request.

16. The system of claim 11, wherein the processor is configured to determine the settings to optimize the fuel economy on a model predictive control model.

17. The system of claim 11, wherein the processor is configured to revise the settings by applying relative weights to the ratio of the port fuel injection system to the direct injection system, the variable compression ratio system, and the independent compression/expansion system to prioritize an order of their revision.

18. The system of claim 11, comprising a multi-link cranktrain in the engine system, wherein the processor is configured to evaluate adjustments to the multi-link cranktrain to predict the variable compression ratio system, and the independent compression/expansion system.

19. The system of claim 11, comprising cam phasers in the engine system, wherein the processor is configured to evaluate adjustments to the cam phasers to predict the variable compression ratio system, and the independent compression/expansion system.

20. A system for controlling an engine system of a vehicle, the system comprising:
a port fuel injection system, a direct injection system, a variable compression ratio system, and an independent compression/expansion system in the engine system; and
a processor in communication with the engine system and configured to:
predict settings for a ratio of the port fuel injection system to the direct injection system, the variable compression ratio system, and the independent compression/expansion system that optimize for a fuel economy of the engine system in the vehicle that is maximized;
compute a particulate rate of the engine system in the vehicle based on the settings, wherein the compute the particulate rate is based on a mapping of various particulate rates of the engine system in the vehicle;
determine whether the particulate rate is below a maximum threshold;
generate, when the particulate rate is below the maximum threshold, command signals to actuators of the engine system to adjust the ratio of the port fuel injection system to the direct injection system, the variable compression ratio system, and the independent compression/expansion system to the settings, optimizing for the fuel economy that is maximized;
revise, when the particulate rate is not below the maximum threshold, the settings for the ratio of the port fuel injection system to the direct injection system, the variable compression ratio system, and the independent compression/expansion system to maintain the particulate rate below the maximum threshold, wherein the optimize for the fuel economy that is maximized is limited by maintaining the particulate rate below the maximum threshold;
generate, when the particulate rate is not below the maximum threshold, revised command signals to the actuators;
reject the command signals, only when revised command signals are generated; and
initiate adjustment of the actuators, based on one of the command signals and the revised command signals.

* * * * *